US010620946B1

(12) United States Patent
Jordan et al.

(10) Patent No.: US 10,620,946 B1
(45) Date of Patent: Apr. 14, 2020

(54) DYNAMIC MODELING FOR OPAQUE CODE DURING STATIC ANALYSIS

(71) Applicant: Oracle International Corporation, Redwood Shores, CA (US)

(72) Inventors: Alexander Jordan, Brisbane (AU); Joonyoung Park, Daejeon (KR)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/168,496

(22) Filed: Oct. 23, 2018

(51) Int. Cl.
| | | |
|---|---|---|
| *G06F 9/44* | (2018.01) | |
| *G06F 8/75* | (2018.01) | |
| *G06F 9/448* | (2018.01) | |
| *G06F 8/41* | (2018.01) | |
| *G06F 8/20* | (2018.01) | |
| *G06F 21/14* | (2013.01) | |
| *G06F 30/20* | (2020.01) | |
| *G06F 9/455* | (2018.01) | |

(52) U.S. Cl.
CPC .............. *G06F 8/75* (2013.01); *G06F 8/20* (2013.01); *G06F 8/443* (2013.01); *G06F 9/448* (2018.02); *G06F 21/14* (2013.01); *G06F 30/20* (2020.01); *G06F 9/4482* (2018.02); *G06F 9/4498* (2018.02); *G06F 9/45504* (2013.01); *G06F 9/45516* (2013.01)

(58) Field of Classification Search
CPC ...... G06F 21/14; G06F 9/4482; G06F 9/4498; G06F 8/45516; G06F 9/45504; G06F 30/20; H04L 41/145
See application file for complete search history.

(56) References Cited

U.S. PATENT DOCUMENTS

| | | | | |
|---|---|---|---|---|
| 6,668,325 | B1* | 12/2003 | Collberg | ................. G06F 21/14 713/194 |
| 2013/0232507 | A1* | 9/2013 | Farrugia | ................. G06F 21/14 719/313 |
| 2018/0197089 | A1* | 7/2018 | Krasser | ................. H04L 41/145 |

OTHER PUBLICATIONS

Ming et al, "LOOP: Logic-Oriented Opaque Predicate Detection in Obfuscated Binary Code", CCS'15, Oct. 2015, 12 pgs < Ming_LOOP.pdf>.*

Preda et al, "Opaque Predicates Detection by Abstract Interpretation", AMAST 2006, LNCS 4019, 2006, pp. 81-95 <Opq_Predicates.pdf>.*

Heule et al, "Mimic: Computing Models for Opaque Code", FSE'15, Italy, Copyright 2015, pp. 1-11 <Heule 2015>.*

Andreasen, E. et al., "Determinacy in Static Analysis for jQuery"; Published in Proceedings of the 2014 ACM International Conference on Object Oriented Programming Systems Languages & Applications, Oct. 19, 2014, pp. 17-31 (15 pages).

(Continued)

*Primary Examiner* — Tuan A Vu
(74) *Attorney, Agent, or Firm* — Ferguson Braswell Fraser Kubasta PC (57) ABSTRACT

A method may include initiating a static analysis of code, identifying an opaque function during the static analysis, and modeling the opaque function by: generating, using an abstract state of the static analysis, sample inputs for the opaque function, collecting outputs for the opaque function by executing, using the abstract state, the opaque function with the sample inputs, and updating the abstract state using the outputs.

20 Claims, 6 Drawing Sheets

(56) References Cited

OTHER PUBLICATIONS

Andreasssen, E. S. et al., "Systematic Approaches for Increasing Soundness and Precision of Static Analyzers", Published in Proceedings of the 6th ACM SIGPLAN International Workshop on State of the Art in Program Analysis, Barcelona, Spain, Jun. 18, 2017, pp. 31-36 (6 pages).

Avgerinos, T. et al., "Enhancing Symbolic Execution with Veritesting"; Published in Proceedings of the 36th International Conference on Software Engineering, Hyderabad, India, May 31, 2014, pp. 1083-1094 (12 pages).

Heule, S. et al., "Mimic: Computing Models for Opaque Code"; Published in Proceedings of the 2015 10th Joint Meeting on Foundations of Software Engineering, Bergamo, Italy, Sep. 2, 2015, pp. 710-720 (11 pages).

Jensen, S. H. et al., "Type Analysis for JavaScript"; 16th International Symposium on Static Analysis, Los Angeles, CA, Aug. 9, 2009, Part of the Lecture Notes in Computer Science book series (LNCS, vol. 5673; pp. 238-255 (18 pages).

Kuhn, D.R. et al., "Software Fault Interactions and Implications for Software Testing", Published in IEEE Journal, Transactions on Software Engineering, vol. 30 Issue 6, Jun. 2004, pp. 418-421 (4 pages).

Midtgaard, J. et al., "QuickChecking Static Analysis Properties", 8th IEEE International Conference on Software Testing, Verification, and Validation (ICST) Apr. 13, 2015 (10 pages).

Park, J. et al., "Battles with False Positives in Static Analysis of JavaScript Web Applications in the Wild", Published in Proceedings of the 38th International Conference on Software Engineering Companion, Austin Texas, May 14, 2016, pp. 61-70 (10 pages).

Qi, D. et al., "Modeling Software Execution Environment", Published in Proceedings of the 19th Working Conference on Reverse Engineering, Kingston, ON, Canada, Oct. 15, 2012, pp. 415-424 (10 pages).

Schaefer, M. S. et al., "Dynamic Determinacy Analysis", In Proceedings of the 34th ACM SIGPLAN Conference on Programming Language Design and Implementation, Seattle, Washington, Jun. 16, 2013, pp. 165-174 (10 pages).

Wei, S. et al., "Practical Blended Taint Analysis for JavaScript", Pblished in Proceedings of the 2013 International Symposium on Software Testing and Analysis, Lugano, Switzerland, Jul. 15, 2013, pp. 336-346 (11 pages).

Zhai, J. et al., "Automatic Model Generation from Documentation for Java API Functions", Proceedings of 38th International Conference on Software Engineering (ICSE), Austin, Texas, May 14, 2016, pp. 380-391 (12 pages).

* cited by examiner

Abstract and Concrete States for y = abs(x) 400

| | Input Abstract Value 402 | (Concrete) Sample Inputs 404 | (Concrete) Outputs 406 | Output Abstract Value 408 |
|---|---|---|---|---|
| Scenario 1: x = integer n 410 | n | n | \|n\| | \|n\| |
| Scenario 2: x is even 412 | even integer | -2, 0, 2 | 0, 2 | even integer |
| Scenario 3: x is odd 414 | odd integer | -1, 1, 3 | 1, 3 | odd integer |
| Scenario 4: x is integer 416 | integer | -2, -1, 0, 1, 2, 3 | 0, 1, 2, 3 | integer |
| Scenario 5: x is integer 418 | integer | -1, 1 | 1 | 1 |

FIG. 4A

Abstract Value Lattice 450

DYNAMIC MODELING FOR OPAQUE CODE DURING STATIC ANALYSIS

BACKGROUND

Static program analysis often must deal with opaque code, or parts of a program that are either not available (e.g., due to missing source code), or too complex for analysis. For example, a static analysis of JavaScript code may need to analyze built-in and library code, since JavaScript's standard library is built into the runtime systems that implement the JavaScript language. Manually-generated models are commonly used to model opaque code, but manual approaches are time-consuming and error-prone. Automatic modeling techniques are often too imprecise to be useful when modeling opaque code represented in a high-level, dynamic language, such as JavaScript. For example, automatic modeling techniques based on specifications represented in natural language depend heavily on the quality and format of the available specifications. And automatic modeling techniques based on dynamic traces resulting from the execution of opaque code are limited to semantics that are observable in the traces.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including initiating a static analysis of code, identifying an opaque function during the static analysis, and modeling the opaque function by: generating, using an abstract state of the static analysis, sample inputs for the opaque function, collecting outputs for the opaque function by executing, using the abstract state, the opaque function with the sample inputs, and updating the abstract state using the outputs.

In general, in one aspect, one or more embodiments relate to a system including a repository configured to store code including an opaque function, a memory coupled to a processor, and a sample generator, executing on the processor and using the memory, configured to generate, using an abstract state of a static analysis of the code, sample inputs for the opaque function. The system further includes a hybrid analyzer, executing on the processor and using the memory, configured to: initiate the static analysis, identify the opaque function during the static analysis, and model the opaque function by: collecting outputs for the opaque function by executing, using the abstract state, the opaque function with the sample inputs, and updating the abstract state using the outputs.

In general, in one aspect, one or more embodiments relate to a non-transitory computer readable medium including instructions that, when executed by a processor, perform: initiating a static analysis of code, identifying an opaque function during the static analysis, and modeling the opaque function by: generating, using an abstract state of the static analysis, sample inputs for the opaque function, collecting outputs for the opaque function by executing, using the abstract state, the opaque function with the sample inputs, and updating the abstract state using the outputs.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for modeling opaque functions during static analysis. In one or more embodiments, an opaque function is modeled using an abstract state of the static analysis. The abstract state may assign abstract values to variables accessed by the opaque function, including environment (e.g., global) variables within the scope of the opaque function. Each abstract value (e.g., even integer, numerical string, etc.) may correspond to multiple concrete values. Each abstract value may be defined relative to other abstract values arranged in an abstract value lattice. The behavior of the opaque function may be dynamically analyzed by executing the opaque function with sample inputs derived from abstract values assigned by the abstract state to the variables accessed by the opaque function. The sample inputs may be generated using combinatorial sampling, to efficiently generate well-distributed sample inputs that explore the opaque function's behavior as much as possible, while avoiding inputs which cover redundant behavior. The outputs of executing the opaque function with the sample inputs may be collected, and then abstracted to an output abstract value that over-approximates the outputs. The abstract state may be updated by assigning the output abstract value to an output variable of the opaque function. The static analysis may then be resumed using the updated abstract state, which models the effect of executing the opaque function. Dynamically analyzing the opaque function relative to the constraints (e.g., abstract values) specified by the abstract state of the static analysis enables the modeled behavior, as represented in the updated abstract state, to be precise.

Figure 1A:
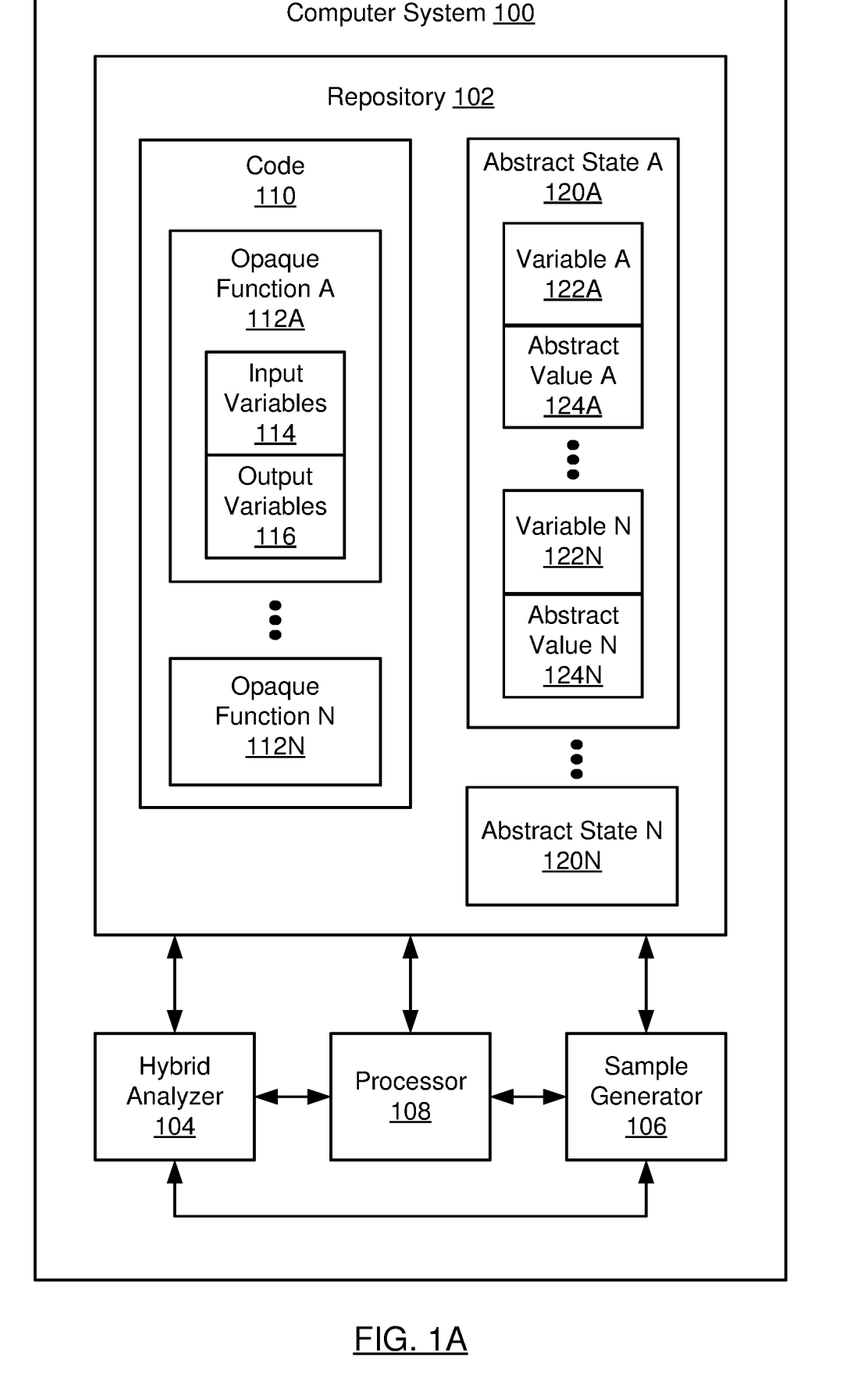
FIG. 1A and FIG. 1B show a system in accordance with one or more embodiments of the invention.

FIG. 1A shows a computer system (100) in accordance with one or more embodiments of the invention. As shown in FIG. 1A, the computer system (100) includes a repository (102), a hybrid analyzer (104), a sample generator (106), and a processor (108). In one or more embodiments, the computer system (100) takes the form of the computing system (500) described with respect to FIG. 5A and the accompanying description below, or takes the form of the client device (526) described with respect to FIG. 5B. In one or more embodiments, the processor (108) takes the form of the processor (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110) and abstract states (120A, 120N). In one or more embodiments, the code (110) is a collection of source code including various software components. The code (110) may include a collection of computer instructions written in a programming language, or intermediate representation (e.g., byte code). In one or more embodiments, the collection of computer instructions may construct and/or reference various objects. The code (110) may include one or more entry points where the code (110) may be invoked by software external to the code (110). Examples of entry points include any function, procedure, or method exposed via an application programming interface (API).

In one or more embodiments, the code (110) includes opaque functions (112A, 112N). In one or more embodiments, an opaque function (112A) is a function, method, or procedure whose source code is unavailable or too complex for analysis. Each opaque function (112A) may include input variables (114) and output variables (116). In addition, the opaque function (112A) may generate side effects on environment (e.g., global) variables. The input variables (114) may be variables that are assigned values by the caller of the opaque function (112A). Conversely, the output variables (116) may be variables that are assigned values by the opaque function (112A) when the opaque function (112A) completes execution. Each of the input variables (114) and each of the output variables (116) may have a corresponding type (e.g., integer, string, etc.). Examples of opaque functions (112A, 112N) may include built-in functions (e.g., part of a language standard and implemented by a runtime engine), Document Object Model (DOM) functions, application programming interfaces (APIs) that are implemented by browsers, etc.

In one or more embodiments, each abstract state (120A, 120N) assigns abstract values (124A, 124N) to variables (122A, 122N). In one or more embodiments, an abstract state (120A) corresponds to a program point in the code (110). For example, the program point may be the invocation of an opaque function (112A), the invocation of a non-opaque function, a statement in the code (110), etc.

In one or more embodiments, each abstract value (124A, 124N) corresponds to a set of concrete values. An abstract value (124A) may correspond to a set of concrete values that may be assigned to a variable (122A) during the execution of the code (110). Examples of abstract values (124A, 124N) for integers include: any integer, any positive integer, any even integer, any odd integer, any nonzero integer, a set of specific integers, etc. Examples of abstract values (124A, 124N) for strings include: any string, any non-empty string, a specific string, a set of specific strings, numerical strings, non-numerical strings, etc. For example, the abstract value $T_{number}$ represents any number and the abstract value $T_{string}$ represents any string. As another example, an abstract integer value may be abstracted as the sign of the integer value (e.g., if it is important to determine whether the integer value can be negative). As yet another example, an abstract value may correspond to a range of concrete integer values. In addition, the abstract string values "number" and "not a number" may be useful in disambiguating between types of string values (e.g., between string values that denote a number vs. string values that do not denote a number).

In one or more embodiments, an abstract value (124A) is a compound abstract value with multiple component abstract values. For example, the abstract value may correspond to a complex object (e.g., a DOM object, or an object with multiple fields and/or properties) or array.

Figure 1B:
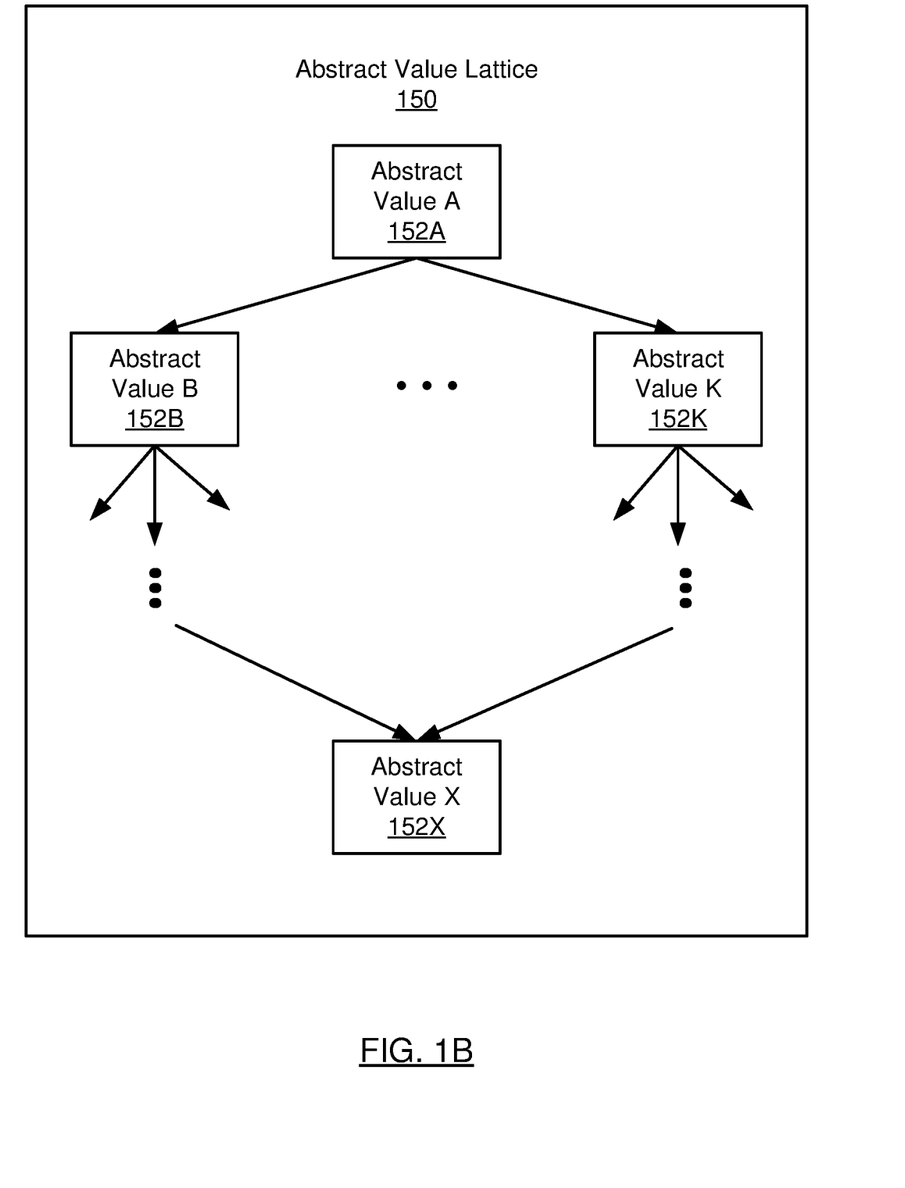

Turning to FIG. 1B, in one or more embodiments, abstract values (e.g., 152A, 152B, 152K, 152X) may be arranged in an abstract value lattice (150). In one or more embodiments, the abstract value lattice (150) defines a partial order on abstract values, such that a "genus" abstract value may include (e.g., precede) other "species" abstract values in the abstract value lattice (150). In other words, the species abstract values may represent sub-types of the genus abstract value. For example, abstract value A (152A) includes both abstract value B (152B) and abstract value K (152K). Continuing this example, abstract value A (152A) may be "integer", abstract value B (152B) may be "even integer", and abstract value K (152K) may be "odd integer". Abstract value X (152X) may be the null abstract value, which does not correspond to any concrete value, and is, by definition, a species of all other abstract values.

In one or more embodiments, a first abstract value (e.g., abstract value A (152A)) covers a second abstract value (e.g., abstract value B (152B) or abstract value K (152K)) when the first abstract value is the immediate predecessor of the second abstract value in the abstract value lattice (150). That is, the first abstract value covers the second abstract value when the first abstract value includes the second abstract value, and there is no intervening third abstract value included by the first abstract value such that the third abstract value includes the second abstract value.

Returning to FIG. 1A, in one or more embodiments, a variable (122A) may be a symbol (e.g., 'x', 'y', 'input', 'result') that references a location in the code (110) where a value is stored, such as an allocation site. Examples of variables (122A, 122N) include: input variables (114) or output variables (116) of opaque functions (112A, 112N), environment (e.g., global) variables, variables accessible in calling stacks of opaque functions (112A, 112N), etc.

In one or more embodiments, a variable (122A) may be a field of an object. An allocation site may be a statement in the code (110) that declares, instantiates, and/or initializes an object. A variable (122A) may refer to a simple allocation site (e.g., a numerical or string value), may refer to a complex allocation site (e.g., a base object or structure containing one or more fields), or may refer to a field in a complex allocation site. The allocation site may contain different values at different points in time. In one or more embodiments, the allocation site may refer to a location in a memory (e.g., a heap memory) of the computer system (100) that is allocated when a function (e.g., an opaque function (112A)) in the code (110) is executed.

In one or more embodiments, the hybrid analyzer (104) is implemented in hardware (e.g., circuitry), software, firmware, and/or any combination thereof. In one or more embodiments, the hybrid analyzer (104) includes functionality to perform a static analysis of the code (110). The static analysis may be a method of analyzing the code (110) without executing the code (110). For example, the goal of the static analysis may be to identify potential coding defects, security flaws, and/or malicious code. The hybrid analyzer (104) may include functionality to identify an opaque function (112A) during the static analysis. The hybrid analyzer (104) may include functionality to update an abstract state (120A) of the static analysis. In one or more embodiments, the hybrid analyzer (104) includes functionality to perform a dynamic analysis of the code (110). The dynamic analysis may be a method of analyzing the code (110) while executing the code (110).

In one or more embodiments, the sample generator (106) may be implemented in hardware (e.g., circuitry), software, firmware, and/or any combination thereof. In one or more embodiments, the sample generator (106) includes functionality to generate sample inputs for an opaque function (112A) using an abstract state (120A) of a static analysis.

In one or more embodiments, the processor (108) includes functionality to execute the code (110). In one or more embodiments, the processor (108) includes functionality to execute the sample generator (106) and/or the hybrid analyzer (104).

While FIG. 1A shows a configuration of components, other configurations may be used without departing from the scope of the invention. For example, various components may be combined to create a single component. As another example, the functionality performed by a single component may be performed by two or more components.

Figure 2:
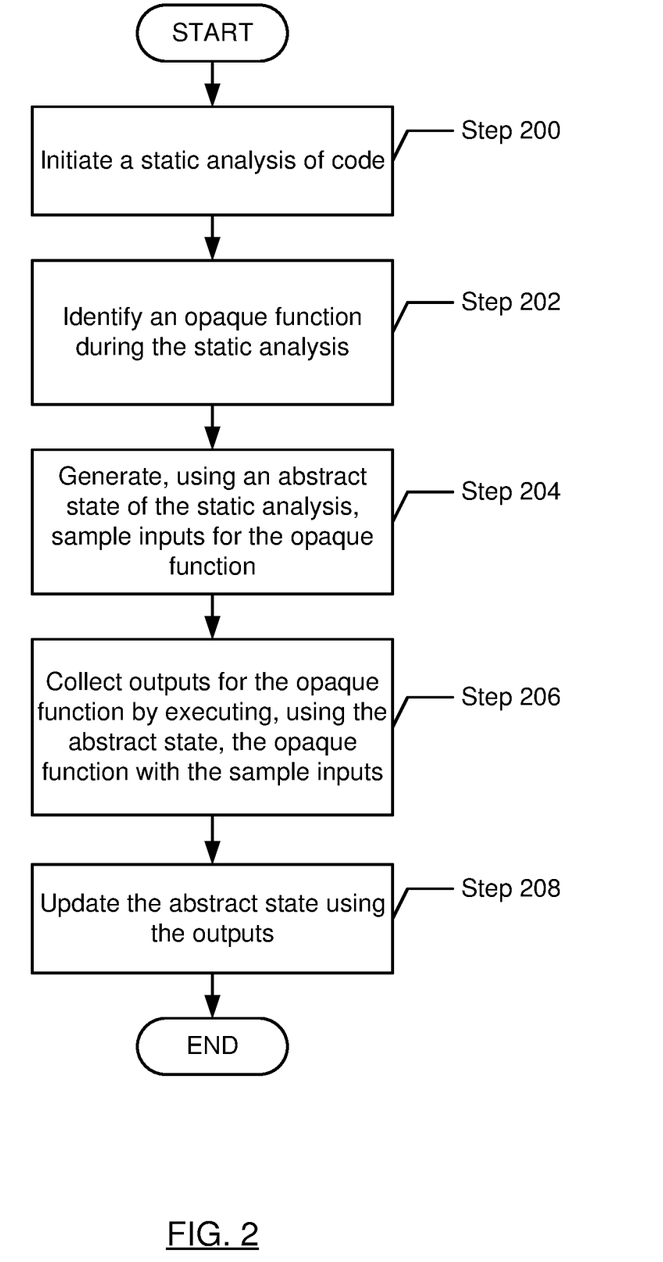
FIG. 2 and FIG. 3 show flowcharts in accordance with one or more embodiments of the invention.

FIG. 2 shows a flowchart in accordance with one or more embodiments of the invention. The flowchart depicts a process for modeling opaque code during static analysis. One or more of the steps in FIG. 2 may be performed by the components (e.g., the hybrid analyzer (104) and/or sample generator (106) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a static analysis of code is initiated. In one or more embodiments, the hybrid analyzer performs the static analysis starting at one or more entry points of the code. In one or more embodiments, the static analysis assigns abstract states to various program points in the code. Each abstract state may assign abstract values to variables. For example, the variables may be input and/or output variables of functions, environment variables, etc.

In one or more embodiments, during the static analysis, the hybrid analyzer assigns abstract values by inferring constraints (e.g., type constraints) on variables accessed by statements in the code. For example, the hybrid analyzer may infer that the value of an input variable is an even integer, or is restricted to be an integer within a range of concrete values.

In Step 202, an opaque function is identified during the static analysis. In one or more embodiments, the hybrid analyzer identifies a function as opaque by finding the name of the function in a list of known opaque functions. In one or more embodiments, a function is identified as opaque when an attempt to locate source code for the function fails. In one or more embodiments, a function is identified as opaque when the amount of time consumed while performing the static analysis of the function exceeds a predetermined amount of time.

In Step 204, sample inputs are generated for the opaque function, using an abstract state of the static analysis. Generating sample inputs may under-approximate the behavior of the opaque function. For example, it is impossible to sample all inputs from an infinite set of possible inputs. In one or more embodiments, the abstract state assigns a vector of abstract values to a vector of input variables of the opaque function. In one or more embodiments, a vector of input concrete values is generated for each input variable, where each input concrete value satisfies the constraints of the corresponding assigned abstract value.

In one or more embodiments, when the assigned abstract value corresponds to a finite set of concrete values, the input concrete values are selected from the finite set. For example, if the assigned abstract value corresponds to integers within a specific range (e.g., integers corresponding to a birth year of a user), then the input concrete values may be sampled from the specific range.

In one or more embodiments, when the assigned abstract value corresponds to an infinite set of concrete values, the input concrete values are selected from the infinite set. For example, the sampled input concrete values may be: commonly used values, values having special properties for specific operators, minimum and/or maximum values, identity and/or inverse elements for a specific operator, etc.

In one or more embodiments, the abstract value corresponds to infinitely many concrete values and the abstract value is also a "genus" abstract value (e.g., odd integer) that covers a finite number of "species" abstract values (e.g., different ranges of odd integers), as defined in an abstract value lattice. In one or more embodiments, input concrete values are generated for the genus abstract value by generating input concrete values for each of the species abstract values.

In one or more embodiments, the abstract value is a compound value with multiple component abstract values. For example, the compound abstract value may be a complex object that includes multiple components (e.g., fields or properties). In one or more embodiments, generating input concrete values for the compound abstract value includes generating input concrete values for each of the component abstract values.

The sample generator may generate sample inputs for the opaque function using any testing technique that constrains input values, including combinatorial testing, feedback-directed random testing, and testing based on type summaries.

Combinatorial sampling may be used to efficiently generate well-distributed sample inputs that achieve high coverage of the opaque function by exploring the opaque function's behavior as much as possible, while avoiding inputs which cover redundant behavior. In one or more embodiments, the sample inputs for the opaque function are generated using combinatorial sampling as follows:

1) Generate all combinations of input values.
2) To avoid exponential overhead, combinatorial testing may be used, where each n-tuple of input values occurs exactly once in the sample inputs for the opaque function. The constant n may be thought of as a predetermined degree of interaction among the input variables.

3) When applying combinatorial testing to software, n is often set to 2, to cover pairwise interactions among input variables. Similarly, setting n to 3 may cover all combinations of input values for triples of input variables.

For example, if the opaque function has 3 input Boolean variables, a, b, and c, and n=1, then 2 vectors of input concrete values are generated (e.g., since each variable may be assigned a value of true in one vector and a value of false in the other vector). Continuing this example, if n=2, then 4 vectors of input concrete values may be generated to cover the possible pairwise combinations of Boolean values.

The combinatorial sampling approach may be generalized to the selection of input variables in the case of compound values, where, as described above, a single input variable corresponds to a compound object. For example, the fields and/or properties of the compound object may be handled as separate variables, where each variable is assigned an abstract value by the abstract state.

In one or more embodiments, feedback-directed random testing may be used to generate the sample inputs. For example, the input concrete values may be selected from the outputs of a previously executed function whose outputs correspond to the assigned abstract value. For example, if the assigned abstract value is "date string" and the previously executed function outputs date strings, then the sample inputs may include date strings generated by the previously executed function. The date strings generated by the previously executed function may be presumed to be valid date strings, whereas randomly generated date strings might not be valid.

In Step 206, outputs for the opaque function are collected by executing, using the abstract state, the opaque function with the sample inputs. Each output may be a concrete value corresponding to an output variable of the opaque function. By executing the opaque function, the hybrid analyzer transitions from static analysis to dynamic analysis. In other words, the hybrid analyzer suspends the static analysis of the code in order to perform a dynamic analysis of the opaque function.

In Step 208, the abstract state is updated using the outputs. In one or more embodiments, the outputs are concrete values that are converted by the hybrid analyzer to an output abstract value that is assigned to an output variable of the opaque function. The output abstract value may correspond to a set of concrete values that is a proper superset of the outputs. In other words, the output abstract value may over-approximate the outputs. For example, in the abstract value lattice, the output abstract value may cover the output concrete values. The output abstract value may be generated using an over-approximation heuristic that compensates for under-approximating the behavior of the opaque function due to the generation of sample inputs in Step 204 above.

Figure 3:
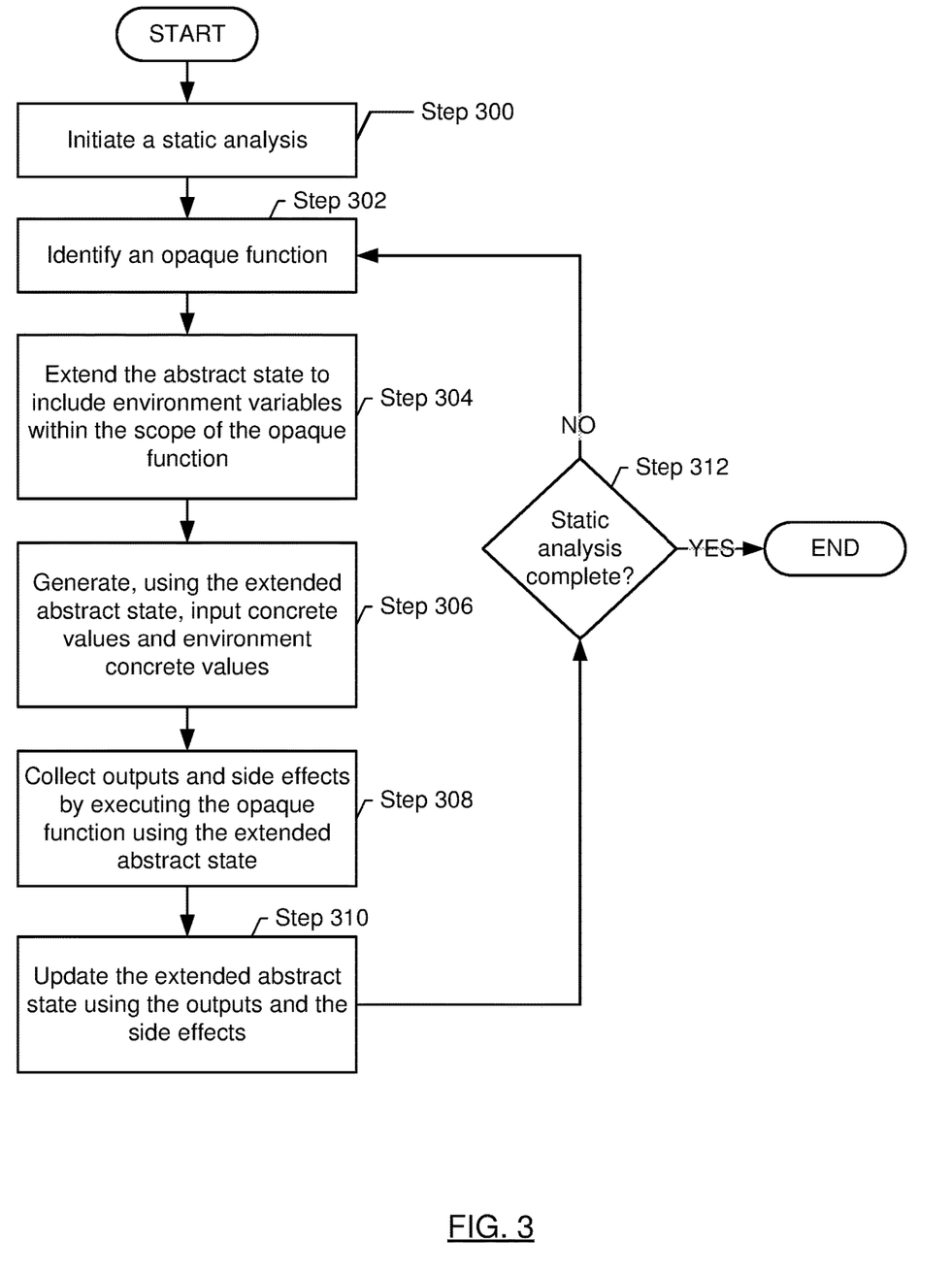

FIG. 3 shows a flowchart in accordance with one or more embodiments of the invention. The flowchart depicts a process for modeling opaque code during static analysis. One or more of the steps in FIG. 3 may be performed by the components (e.g., the hybrid analyzer (104) and/or sample generator (106) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, a static analysis is initiated (see description of Step 200 above).

In Step 302, an opaque function is identified during the static analysis (see description of Step 202 above).

In Step 304, the abstract state of the static analysis is extended to include one or more environment variables within the scope of the opaque function. In one or more embodiments, the extended abstract state assigns an environment abstract value to each environment variable within the scope of the opaque function. For example, the abstract state may be extended to model side effects of the opaque function (e.g., if the opaque function is an external library function).

In one or more embodiments, the scope of the opaque function includes the calling stack of the opaque function and/or the heap memory of the computer system. For example, the calling stack may include local variables defined by one or more functions in the calling chain resulting in the invocation of the opaque function. The heap memory may include global variables that are accessible to the opaque function.

In Step 306, input concrete values and environment concrete values are generated, using the extended abstract state of the static analysis (see description of Step 204 above). In one or more embodiments, environment concrete values are generated for each environment variable, where each environment concrete value satisfies the constraints of the corresponding environment abstract value assigned by the extended abstract state.

In Step 308, outputs and side effects are collected by executing, using the extended abstract state, the opaque function with the sample inputs (see description of Step 206 above). Each side effect may be a concrete value corresponding to a modification to the value of an environment variable within the scope of the opaque function.

In Step 310, the extended abstract state is updated using the outputs and the side effects (see description of Step 208 above). In one or more embodiments, the side effects corresponding to an environment variable are abstracted to a side effect abstract value. The side effect abstract value may correspond to a set of concrete values that is a proper superset of the side effects. If the side effect abstract value differs from the environment abstract value originally assigned to the environment variable by the extended abstract state, then the extended abstract state is updated by assigning the side effect abstract value to the environment variable in the extended abstract state.

If, in Step 312, the static analysis is complete, the process ends. Otherwise, the hybrid analyzer resumes the static analysis, and again executes Step 302, Step 304, Step 306, Step 308, and Step 310 for each additional opaque function that is identified during the static analysis of the code.

Figure 4A:
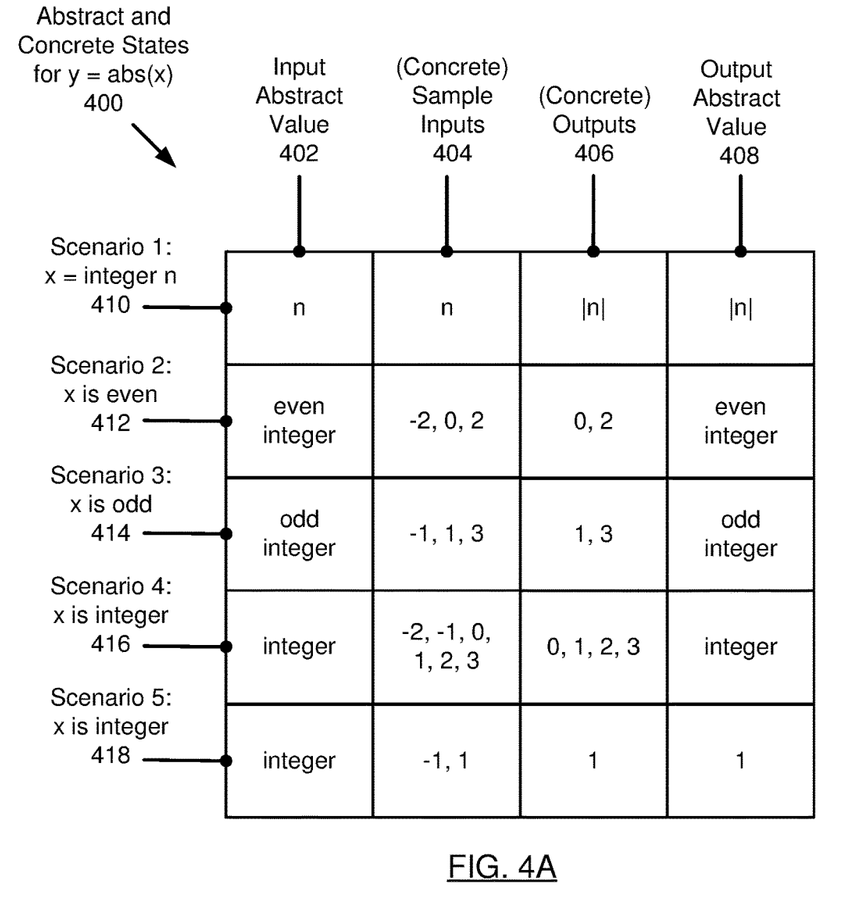
FIG. 4A and FIG. 4B show examples in accordance with one or more embodiments of the invention.
Figure 4B:
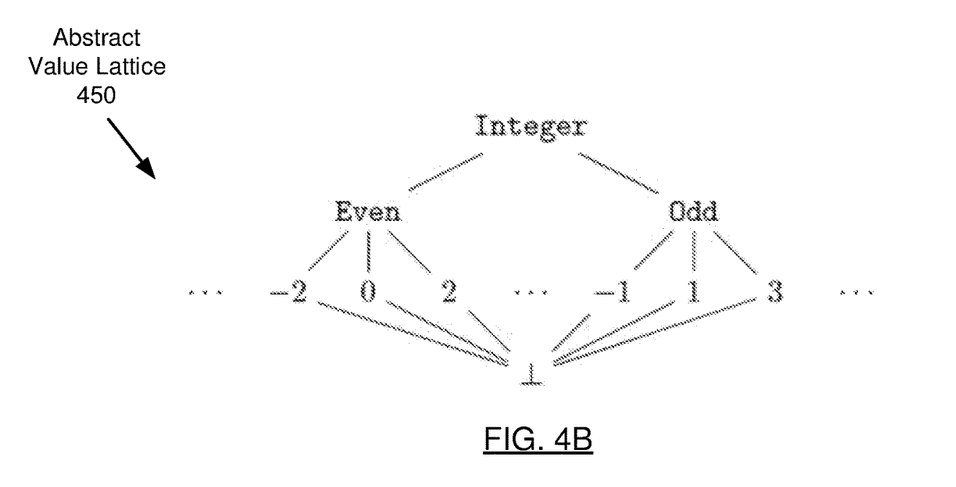

The following example is for explanatory purposes only and not intended to limit the scope of the invention. FIG. 4A and FIG. 4B show an implementation example in accordance with one or more embodiments of the invention. FIG. 4A illustrates abstract and concrete states (400) corresponding to the static and dynamic analysis of an opaque function (e.g., (112a) in FIG. 1). The opaque function is an absolute value function represented by the code snippet y=abs(x).

Initially, the hybrid analyzer ((104) in FIG. 1) initiates a static analysis of code ((110) in FIG. 1). The static analysis uses the abstract value lattice (450) of FIG. 4B to assign abstract values to variables in the code. The hybrid analyzer identifies the absolute value function as opaque (e.g., due to the absence of source code for the absolute value function), and proceeds to model the absolute value function using the current abstract state (e.g., (120a) in FIG. 1) of the static analysis. The abstract state assigns an input abstract value (402) to the input variable, x, of the absolute value function. The rows of the abstract and concrete states (400) illustrate 5 different scenarios (410, 412, 414, 416, 418) in which the abstract state assigns input abstract values to the input variable x.

In scenario 1 (410), the input abstract value (402) assigned to input variable x by the abstract state corresponds to a constant integer n. Since the input abstract value corresponds to a single concrete value, the sample generator ((106) in FIG. 1) generates a single concrete value of n as a sample input (404). The hybrid analyzer then performs a dynamic analysis by executing the absolute value function once, with the sample input x=n. The hybrid analyzer then collects the output (406) returned from executing the absolute value function. In scenario 1 (410), the output is |n| (e.g., where |n|=n if n>=0, and |n|=−n otherwise). The hybrid analyzer then converts the output |n| to an output abstract value (408) that corresponds to the single concrete value |n|. The hybrid analyzer then updates the abstract state of the static analysis by assigning the output abstract value |n| to output variable y of the absolute value function. The hybrid analyzer then continues the static analysis. In scenario 1 (410), the output abstract value |n| is computed precisely, since there was no loss of precision due to converting the output concrete value |n| to the output abstract value |n|.

In scenario 2 (412), the input abstract value (402) assigned to input variable x by the abstract state is "even integer" (see the abstract value lattice (450) of FIG. 4B). Since the input abstract value corresponds to an infinite number of concrete values, the sample generator generates multiple sample inputs (404), in this case −2, 0, and 2. The hybrid analyzer then performs a dynamic analysis by executing the absolute value function 3 times, with the sample inputs x=−2, x=0, and x=2. The hybrid analyzer then collects the outputs (406) returned from executing the absolute value function, in this case 0 and 2. The hybrid analyzer then over-approximates the outputs by converting the outputs 0 and 2 to the output abstract value (408) that is the immediate predecessor covering both abstract values 0 and 2. According to the abstract value lattice (450) of FIG. 4B, the immediate predecessor abstract value is "even integer". The hybrid analyzer then updates the abstract state of the static analysis by assigning the output abstract value "even integer" to output variable y. The hybrid analyzer then continues the static analysis. In scenario 2 (412), the output abstract value "even integer" is computed precisely, since the under-approximation due to sampling the input abstract value "even integer" compensates for any loss of precision due to over-approximating the outputs to the output abstract value "even integer".

In scenario 3 (414), the input abstract value (402) assigned to input variable x by the abstract state is "odd integer". Since the input abstract value corresponds to an infinite number of concrete values, the sample generator generates multiple sample inputs (404), in this case −1, 1, and 3. The hybrid analyzer then performs a dynamic analysis by executing the absolute value function 3 times, with the sample inputs x=−1, x=1, and x=3. The hybrid analyzer then collects the outputs (406) returned from executing the absolute value function, in this case 1 and 3. The hybrid analyzer then over-approximates the outputs by converting the outputs 1 and 3 to the output abstract value (408) that is the immediate predecessor covering both abstract values 1 and 3. According to the abstract value lattice (450) of FIG. 4B, the immediate predecessor abstract value is "odd integer". The hybrid analyzer then updates the abstract state of the static analysis by assigning the output abstract value "odd integer" to the output variable y. The hybrid analyzer then continues the static analysis. In scenario 3 (414), the output abstract value "odd integer" is computed precisely, since the under-approximation due to sampling the input abstract value "odd integer" compensates for any loss of precision due to over-approximating the outputs to the output abstract value "odd integer".

In scenario 4 (416), the input abstract value (402) assigned to input variable x by the abstract state is "integer" (see the abstract value lattice (450) of FIG. 4B). Since the input abstract value "integer" corresponds to infinitely many concrete values, and the input abstract value "integer" also has two immediate successors (i.e., "even integer" and "odd integer") in the abstract value lattice, the sample generator recursively generates sample inputs (404) for each of the covered abstract values. In this case, the sample generator generates sample inputs −2, 0, and 2 for the abstract value "even integer", and sample inputs −1, 1, and 3 for the abstract value "odd integer". The hybrid analyzer then performs a dynamic analysis by executing the absolute value function 6 times, with the sample inputs x=−2, x=−1, x=0, x=1, x=2, and x=3. The hybrid analyzer then collects the outputs (406) returned from executing the absolute value function, in this case 0, 1, 2, and 3. The hybrid analyzer then over-approximates the outputs by converting the outputs 0, 1, 2, and 3 to the output abstract value (408) that is the immediate predecessor covering both abstract values 0, 1, 2, and 3. According to the abstract value lattice (450) of FIG. 4B, the immediate predecessor abstract value is "integer". The hybrid analyzer then updates the abstract state of the static analysis by assigning the output abstract value "integer" to the output variable y. The hybrid analyzer then continues the static analysis. In scenario 4 (416), the output abstract value "integer" is computed precisely, since the under-approximation due to sampling the input abstract value "integer" compensates for the over-approximation due to converting the outputs to the output abstract value "integer".

Scenario 5 (418) is similar to scenario 4 (416), except that only 2 sample inputs are generated: −1 and 1. In scenario 5 (418), the outputs collected from executing the absolute value function with the sample inputs are both 1, a single concrete value, which is incorrectly used as the output abstract value. Thus, scenario 5 (418) illustrates the potential limitations of sampling, and importance of selecting well-distributed sample inputs that adequately cover the relevant behavior of the opaque function.

Figure 5A:
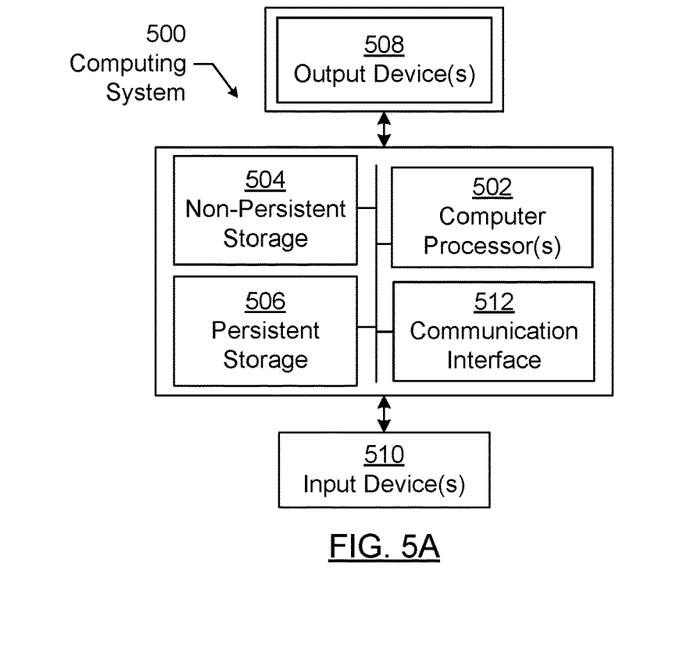
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
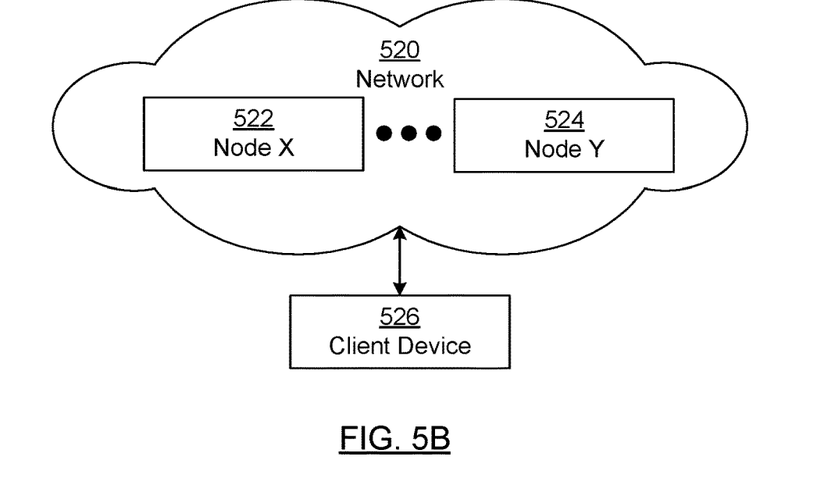

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method implemented with a computer system having at least one processor having thereon memory-stored instructions which when executed by the processor, cause the processor to perform the method, comprising:
   identifying an opaque function during a static analysis of code, wherein the opaque function comprises an output variable; and
   modeling the opaque function by:
   generating sample inputs for the opaque function,
   collecting outputs for the opaque function by executing the opaque function with the sample inputs,
   converting the outputs to an output abstract value that corresponds to a proper superset of the outputs, and
   assigning, in an abstract state of the static analysis, the output abstract value to the output variable.

2. The method of claim 1,
   wherein the opaque function further comprises an input variable,
   wherein the abstract state comprises an input abstract value for the input variable,
   wherein the sample inputs comprise input concrete values corresponding to the input abstract value.

3. The method of claim 2, further comprising:
   extending the abstract state to further comprise an environment abstract value for an environment variable within a scope of the opaque function,
   wherein modeling the opaque function further comprises:
   generating, using the extended abstract state, environment concrete values corresponding to the environment abstract value,
   collecting side effects corresponding to the environment variable by executing, using the extended abstract state, the opaque function with the sample inputs, and
   updating the extended abstract state using the side effects.

4. The method of claim 3, wherein the environment variable is stored in one selected from the group consisting of a heap memory of a computer system, and a stack memory of the computer system.

5. The method of claim 2,
   wherein the input abstract value comprises a plurality of abstract values in an abstract value lattice, and
   wherein generating the sample inputs comprises generating input concrete values corresponding to each of the plurality of abstract values.

6. The method of claim 2, further comprising:
   identifying, in the code, a previously executed function whose outputs correspond to the input abstract value; and
   collecting the outputs of the previously executed function,
   wherein the sample inputs comprise one or more of the outputs of the previously executed function.

7. The method of claim 2, further comprising:
   deriving, during the static analysis, the input abstract value from a constraint on a variable accessed in a statement in the code that is executed before the opaque function is executed.

8. The method of claim 1,
   wherein the opaque function further comprises a vector of input variables,
   wherein the abstract state comprises an input abstract value for each of the vector of input variables, and
   wherein generating the sample inputs comprises:
   generating input variable pairs each comprising two input variables of the vector of input variables, and
   generating, for each of the input variable pairs, a vector of input value pairs each comprising a pair of concrete values each corresponding to the input abstract value for the respective input variable of the input variable pair,
   wherein the input value pair appears in the sample inputs at most once.

9. A system, comprising:
   a repository configured to store code comprising an opaque function, wherein the opaque function comprises an output variable;
   a memory coupled to a processor;
   a sample generator, executing on the processor and using the memory, configured to generate sample inputs for the opaque function; and
   a hybrid analyzer, executing on the processor and using the memory, configured to:
   identify the opaque function during a static analysis of the code, and
   model the opaque function by:
   collecting outputs for the opaque function by executing the opaque function with the sample inputs
   convert the outputs to an output abstract value that corresponds to a proper superset of the outputs, and
   assign, in an abstract state of the static analysis, the output abstract value to the output variable.

10. The system of claim 9,
wherein the opaque function further comprises an input variable,
wherein the abstract state comprises an input abstract value for the input variable,
wherein the sample inputs comprise input concrete values corresponding to the input abstract value.

11. The system of claim 10,
wherein the hybrid analyzer is further configured to:
extend the abstract state to further comprise an environment abstract value for an environment variable within a scope of the opaque function, and
wherein modeling the opaque function further comprises:
generating, using the extended abstract state, environment concrete values corresponding to the environment abstract value,
collecting side effects corresponding to the environment variable by executing, using the extended abstract state, the opaque function with the sample inputs, and
updating the extended abstract state using the side effects.

12. The system of claim 11, wherein the memory further comprises a heap memory and a stack memory, and wherein the environment variable is stored in one selected from the group consisting of the heap memory and the stack memory.

13. The system of claim 10,
wherein the input abstract value comprises a plurality of abstract values in an abstract value lattice, and
wherein the sample generator is further configured to generate sample inputs for the opaque function by generating input concrete values corresponding to each of the plurality of abstract values.

14. The system of claim 10, wherein the sample generator is further configured to:
identify, in the code, a previously executed function whose outputs correspond to the input abstract value; and
collect the outputs of the previously executed function,
wherein the sample inputs comprise one or more of the outputs of the previously executed function.

15. The system of claim 9,
wherein the opaque function further comprises a vector of input variables,
wherein the abstract state comprises an input abstract value for each of the vector of input variables, and
wherein the sample generator is further configured to generate sample inputs for the opaque function by:
generating input variable pairs each comprising two input variables of the vector of input variables, and
generating, for each of the input variable pairs, a vector of input value pairs each comprising a pair of concrete values each corresponding to the input abstract value for the respective input variable of the input variable pair,
wherein the input value pair appears in the sample inputs at most once.

16. A non-transitory computer readable medium comprising instructions that, when executed by a processor, perform:
identifying an opaque function during a static analysis of code, wherein the opaque function comprises an output variable; and
modeling the opaque function by:
generating sample inputs for the opaque function,
collecting outputs for the opaque function by executing the opaque function with the sample inputs,
converting the outputs to an output abstract value that corresponds to a proper superset of the outputs, and
assigning, in an abstract state of the static analysis, the output abstract value to the output variable.

17. The non-transitory computer readable medium of claim 16,
wherein the opaque function further comprises an input variable,
wherein the abstract state comprises an input abstract value for the input variable,
wherein the sample inputs comprise input concrete values corresponding to the input abstract value.

18. The non-transitory computer readable medium of claim 17, further comprising instructions that perform:
extending the abstract state to further comprise an environment abstract value for an environment variable within a scope of the opaque function,
wherein modeling the opaque function further comprises:
generating, using the extended abstract state, environment concrete values corresponding to the environment abstract value,
collecting side effects corresponding to the environment variable by executing, using the extended abstract state, the opaque function with the sample inputs, and
updating the extended abstract state using the side effects.

19. The non-transitory computer readable medium of claim 17,
wherein the input abstract value comprises a plurality of abstract values in an abstract value lattice, and
wherein generating the sample inputs comprises generating input concrete values corresponding to each of the plurality of abstract values.

20. The non-transitory computer readable medium of claim 16,
wherein the opaque function further comprises a vector of input variables,
wherein the abstract state comprises an input abstract value for each of the vector of input variables, and
wherein generating the sample inputs comprises:
generating input variable pairs each comprising two input variables of the vector of input variables, and
generating, for each of the input variable pairs, a vector of input value pairs each comprising a pair of concrete values each corresponding to the input abstract value for the respective input variable of the input variable pair,
wherein the input value pair appears in the sample inputs at most once.

* * * * *

UNITED STATES PATENT AND TRADEMARK OFFICE
CERTIFICATE OF CORRECTION

PATENT NO. : 10,620,946 B1
APPLICATION NO. : 16/168496
DATED : April 14, 2020
INVENTOR(S) : Jordan et al.

Page 1 of 1

It is certified that error appears in the above-identified patent and that said Letters Patent is hereby corrected as shown below:

On the Title Page

On page 2, Column 2, item [56], Line 17, delete "Pblished" and insert -- Published --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*